US008688752B2

(12) United States Patent
Solovey et al.

(10) Patent No.: US 8,688,752 B2
(45) Date of Patent: Apr. 1, 2014

(54) METHOD AND SYSTEM FOR DEPLOYING A MODEL-BASED APPLICATION TO AN APPLICATION SERVER

(75) Inventors: Edward Solovey, Brookline, MA (US); Catherine G. Reilly, Wellesley, MA (US); Thomas Jordahl, Arlington, MA (US); Basil C. Hosmer, Winchester, MA (US); Svetlin Kalaydjiev, Somerville, MA (US)

(73) Assignee: Adobe Sytems Incorporated, San Jose, CA (US)

( * ) Notice: Subject to any disclaimer, the term of this patent is extended or adjusted under 35 U.S.C. 154(b) by 1089 days.

(21) Appl. No.: 12/550,051

(22) Filed: Aug. 28, 2009

(65) Prior Publication Data

US 2014/0032725 A1    Jan. 30, 2014

(51) Int. Cl.
*G06F 17/30* (2006.01)

(52) U.S. Cl.
USPC .......................................... 707/809

(58) Field of Classification Search
CPC ........ G06F 8/60; G06F 8/76; G06F 17/30292
USPC ......................... 707/802, 791, 803, 809, 810; 717/104–105
See application file for complete search history.

(56) References Cited

U.S. PATENT DOCUMENTS

| 6,457,020 | B1 * | 9/2002 | Carey et al. ................... 707/714 |
| 6,735,593 | B1 * | 5/2004 | Williams .............................. 1/1 |
| 7,739,223 | B2 * | 6/2010 | Vaschillo et al. ..................... 1/1 |
| 7,895,241 | B2 * | 2/2011 | Schoen et al. ................ 707/802 |
| 8,239,426 | B2 * | 8/2012 | Rangadass et al. ........... 707/809 |
| 8,326,888 | B2 * | 12/2012 | Schoen et al. ................ 707/802 |
| 2005/0050068 | A1 * | 3/2005 | Vaschillo et al. ............. 707/100 |
| 2007/0226196 | A1 * | 9/2007 | Adya et al. ......................... 707/3 |
| 2008/0189240 | A1 * | 8/2008 | Mullins et al. .................... 707/2 |
| 2008/0189679 | A1 * | 8/2008 | Rodriguez et al. ............ 717/105 |
| 2009/0019022 | A1 * | 1/2009 | Schallert et al. ................... 707/4 |
| 2009/0113382 | A1 * | 4/2009 | Chancey et al. .............. 717/104 |
| 2009/0138436 | A1 * | 5/2009 | Halberstadt et al. .............. 707/3 |

* cited by examiner

*Primary Examiner* — Hung T Vy
(74) *Attorney, Agent, or Firm* — Schwegman Lundberg & Woessner, P.A.

(57) ABSTRACT

Computer-based methods and systems for deploying model-driven applications to an application server are described. Consistent with an embodiment of the invention, an application server includes a model deployment module that provides a model deployment service. The model deployment module receives as input a data model that serves as a single source of truth for an application. Based on the input model, the model deployment module configures the application server, for example, by automatically generating object-relational mapping logic that facilitates data persistence by mapping data elements in an object domain to data elements in a relational database domain. Additionally, the model deployment module generates a utility module that supports advanced modeling capabilities, including derived properties and constraints.

22 Claims, 5 Drawing Sheets

METHOD AND SYSTEM FOR DEPLOYING A MODEL-BASED APPLICATION TO AN APPLICATION SERVER

TECHNICAL FIELD

The present disclosure generally relates to model-driven software development tools. More specifically, the present disclosure relates to methods and systems for deploying a model-based application to an application server.

BACKGROUND

A model-driven software development technique is a development methodology in which models, or abstractions, are utilized to implement a software application. For example, utilizing a model-driven software development tool, an application developer may develop a graphical or text-based model of a software application. The model is then provided as input to a code generator, which analyzes the model and generates application code for a target platform based on the model.

A variety of problems exist with conventional model-driven software development tools. First, many conventional model-driven software development tools only generate a portion of the necessary code required to successfully deploy a fully functional application. For instance, many development tools will only generate a portion of the server-side code (e.g., the application tier, or, the database tier) that is required to successfully implement a working application. This leaves the application developer to manually code the remaining portions of the server-side code. Similarly, some tools only generate server-side code (or, client-side code) based on a model, leaving the application developer to manually generate the client-side code (or, server side-code).

Another problem with many conventional development tools is that they lack the ability to fully deploy the code generated based on the model. For instance, many development tools generate code, but require an application developer to perform various configuration tasks at the target platform (e.g., an application server), and/or manually install the code on the target platform. This problem is compounded when the application is bound for a target platform that utilizes an object-oriented programming paradigm in conjunction with a relational database to persist data. In such a scenario, the code that performs the translation or conversion between data elements in the object domain and data elements in the relational database domain must be updated every time the database schema changes. Consequently, application developers are often tasked with manually updating and configuring the application code.

DESCRIPTION OF THE FIGURES

Some embodiments are illustrated by way of example and not limitation in the figures of the accompanying drawings, in which.

DETAILED DESCRIPTION

Figure 1:
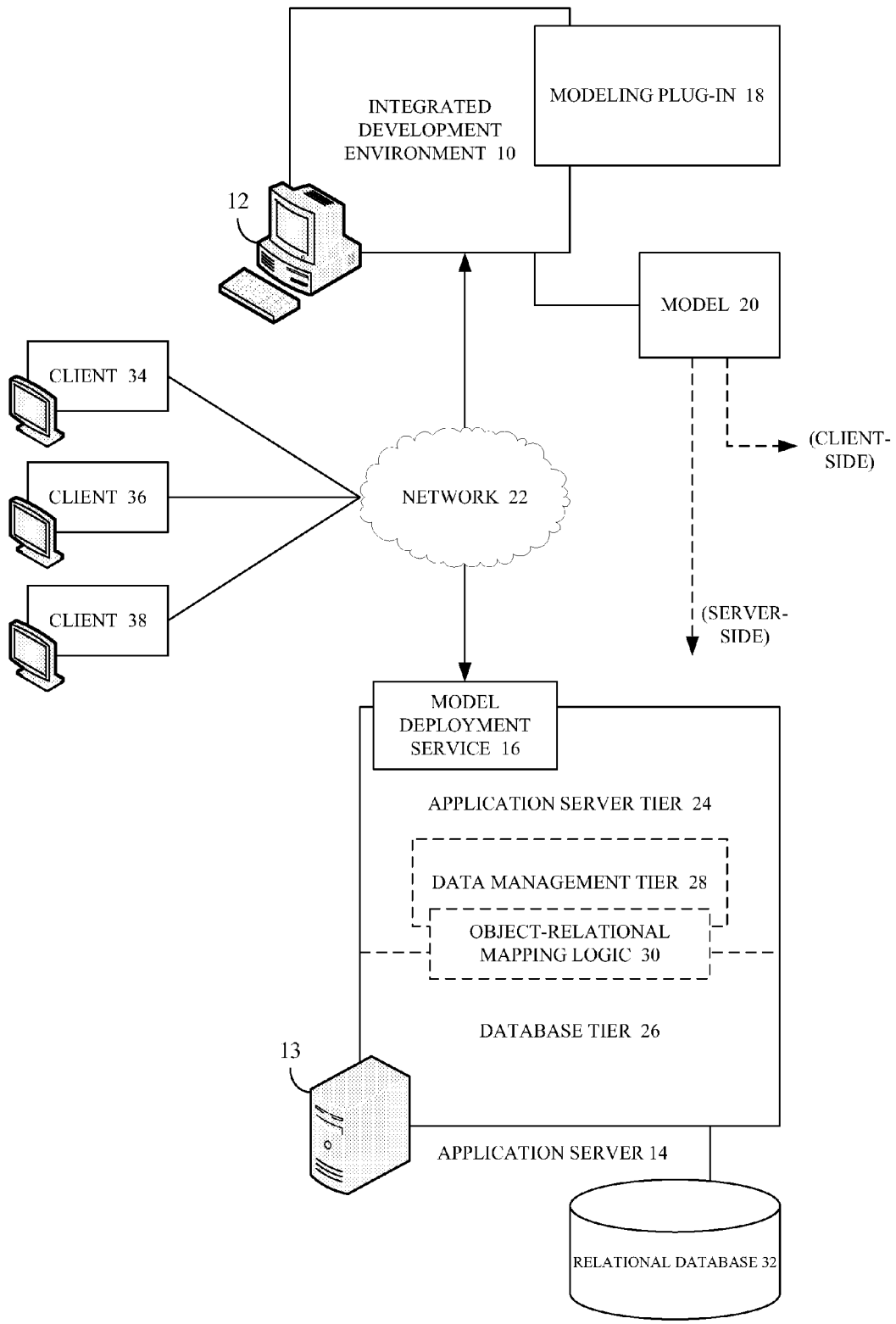
FIG. 1 is a functional block diagram of a model-driven software development environment including a model-based software development application (e.g., integrated development environment) executing on a first computer system coupled to an application server with a model deployment service, consistent with an embodiment of the invention.

Methods and systems for deploying a model-based application to an application server are described. In the following description, for purposes of explanation, numerous specific details are set forth in order to provide a thorough understanding of the various aspects of different embodiments of the present invention. It will be evident, however, to one skilled in the art, that the present invention may be practiced without these specific details.

Consistent with an embodiment of the invention, an application server includes a model deployment service, facilitated by a model deployment module, which enables the deployment of a model-based software application at the application server. Accordingly, an application developer with a complete and annotated data model can utilize the model deployment service to fully create and configure the application server for the application described by the model. In some embodiments, deploying a fully annotated model enables an application developer to generate a working application without having to write a single line of code and without having to manually configure any portion of the application server.

The model deployment service enables, through the use of a single model, the configuration of the database tier. For instance, the model deployment service provides a mechanism to establish the database schemas (e.g., tables and indices) defined by the model, and enables the creation and/or configuration of object-relational mapping logic to map data elements within the object domain with data elements residing in the relational database domain, thereby providing a mechanism for persisting application data.

In addition to enabling the configuration of the database tier, the model deployment service enables the configuration of the application server tier. In some embodiments, this involves the creation and configuration of destination objects that enable client applications to perform create, read, update and delete (CRUD) operations on the data described by the model and persisted in the relational database.

Furthermore, in contrast to many conventional model-driven application development approaches, some embodiments of the invention provide a modeling framework that supports advanced modeling and data processing features, including support for derived properties, constraints, validations, variant properties, and style information. Furthermore, in some embodiments, tight integration between the modeling framework and the data management tier (e.g., part of the application server tier) allows support for advanced features of the data management tier to be accessed and controlled via the modeling framework. For instance, in some embodiments, the modeling framework, in conjunction with the data management tier, facilitates advanced features including: data caching, data synchronization across all participating clients, efficient paging of data out to clients, and lazy loading of associations. Other aspects of various embodiments of the invention are described in greater detail below, in connection with the description of the figures.

FIG. 1 is a functional block diagram of a model-driven software development environment including a model-based software development application (e.g., integrated development environment 10 (IDE) and modeling plug-in 18) executing on a first computer system 12 coupled to an application server 14 with a model deployment service 16, consistent with an embodiment of the invention. Together, the IDE 10 and modeling plug-in 18 provide a model-driven software development application, which enables an application developer to generate and edit a model 20, and ultimately deploy an application, based on the model 20, to an application server 14. Although in FIG. 1 the software development application is shown as an IDE 10 with a modeling plug-in 12, in other embodiments, the software development application may be an integrated, self-contained solution, for example, not requiring a plug-in. In any case, the software development application or model-generating tool enables an application developer to generate a model for use with the model deployment service 16 at an application server 14.

In some embodiments, the generated model 20 is the basis for both server-side and client-side application logic. In some embodiments, the model 20 may have a graphical representation, while in alternative embodiments, the model 20 may be text-based, or a combination of graphical elements and text. In some embodiments, the model 20 can be communicated to the application server 14 over a network 22 directly from the software development application. For instance, the software development application may provide a user interface component enabling an application developer to select a particular application server to which a particular model is to be automatically communicated, and deployed.

As illustrated in FIG. 1, the application server 14 includes both an application server tier 24 and database tier 26, in addition to a model deployment service 16. When the model deployment service 16 is invoked to deploy a model, the model deployment service 16 will receive and process the model, configure all of the relevant application and database elements of the application server tier and database tier, and generate any required runtime code. As described more completely below, in some embodiments, the model deployment service 16 generates destination objects for use with the data management tier 28, and data access objects for use with the object-relational mapping logic 20. Together, these objects (destination objects and data access objects) provide a mechanism for client applications to perform data operations (e.g., CRUD operations) on data that is persisted in the relational database 32. Accordingly, once a model-based application is deployed to an application server 14, client applications, such as clients 32, 34 and 36, can interact with the deployed application residing with the application server 14.

As used in FIG. 1, the term "application server" 14 refers to the various software components comprising the application server framework, for example, residing and executing on the server computer (with reference number 13). In one embodiment, the application server 14 may be a version of Apache Tomcat, an open source software implementation of the Java Servlet and JavaServer Pages technologies. In some embodiments, the data management tier 28 may be a web application implemented with a version of LiveCycle Data Services, developed by, and available from, Adobe, Inc. of San Jose, Calif. However, skilled artisans will readily recognize that the terms "application server", "application server framework" and "data management tier" generally refer to the software framework that is utilized to expose application logic (e.g., business logic) to web- or network-based client applications, often through the use of an application programming interface (API). Moreover, although not necessarily the case, application servers are frequently Java-based (e.g., based on Java Platform, Enterprise Edition, or Java EE). Thus, although example embodiments may be described in the context of an application server based on Tomcat and LiveCycle Data Services, the inventive concepts described and claimed herein are applicable to a wide variety of application servers, server frameworks, and web applications, beyond those that might specifically rely on an implementation of Tomcat and LiveCycle Data Services.

In some embodiments, data is converted from an object domain to a relational database domain, and back again, through the use of a technology generally referred to as object-relational mapping (ORM). In particular, in some embodiments of the invention, the ORM functionality is facilitated by a version of Hibernate. Hibernate is an object-relational mapping (ORM) library for the Java programming language, providing a framework for mapping an object-oriented domain to a traditional relational database. However, various alternative ORM implementations might be used without departing from the scope and spirit of the invention.

Figure 2:
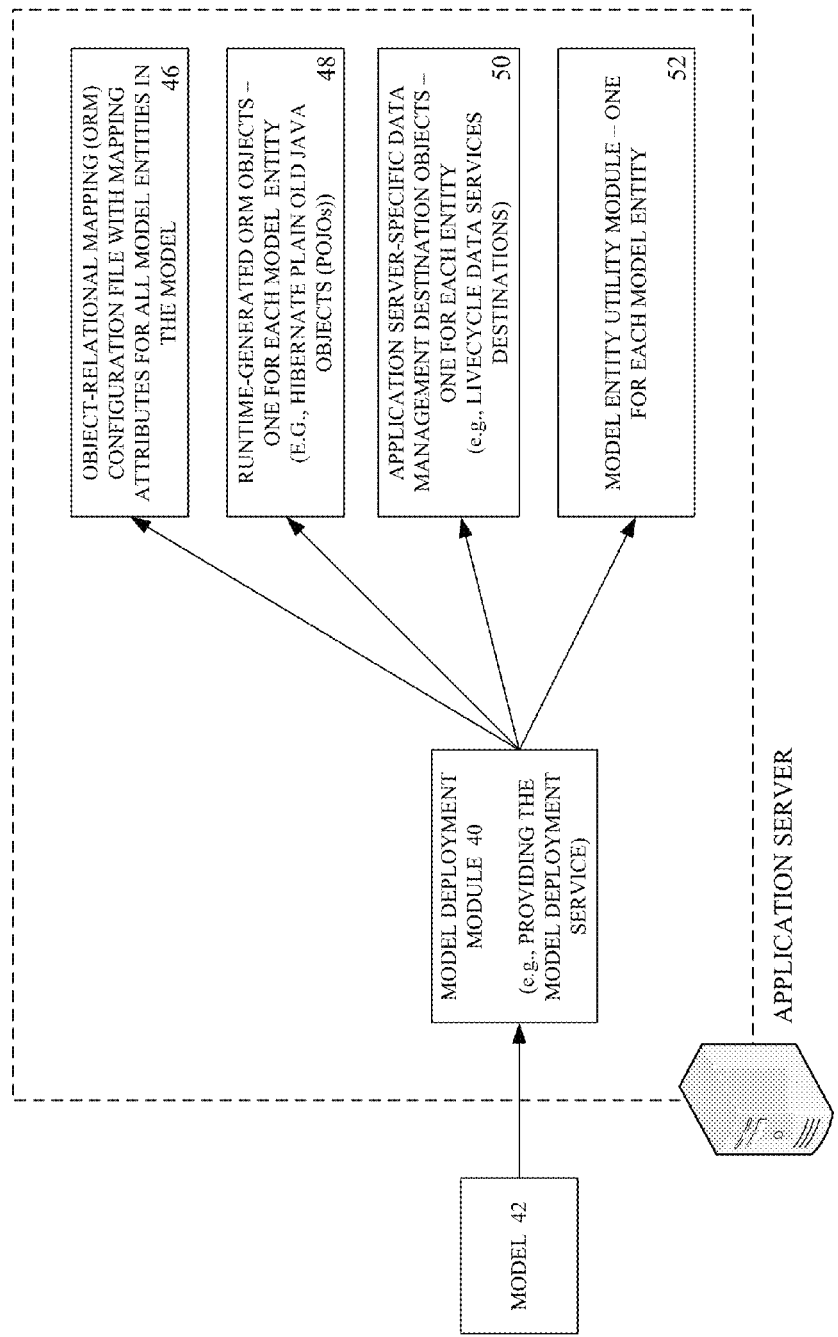
FIG. 2 is a block diagram showing the inputs and outputs of a model deployment module that provides a model deployment service for an application server, according to an embodiment of the invention.

FIG. 2 is a block diagram showing the inputs and outputs of a model deployment module 40 that provides a model deployment service for an application server 32, according to an embodiment of the invention. As illustrated in FIG. 2, the model deployment module 40 is shown to reside and execute at a server computer executing an application server 42. In general, the model deployment module 40, which in some embodiments consists of several independently executing sub-modules, receives as input a model 42, and processes the model to, among other things, generate the various outputs shown in FIG. 2.

In the context of an embodiment of the invention, the model 44 is an abstract structure that describes how data is represented and accessed, at the application server 42. The model 44 is broadly similar in scope and granularity to a relational database schema, in the sense that it defines an interrelated set of structured data collections, and provides the means to express specification at structure, collection, and relationship scales. The model defines entities (e.g., model entities), which are abstract interrelated data objects. Model entities represent custom data types and are made up of data elements referred to as data properties, which correspond to persistent storage, and derived properties, which are not backed by persistent storage and enable behavior customization in expressions over data properties and function calls. A model also defines abstract services responsible for delivering model entities to and from clients. Services declare collections of functions, external callable endpoints that can be invoked within value expressions. Consistent with some embodiments of the invention, in addition to entities and services, definitions found in the model 44 include styles, which bundle user-interface-related information with data types, and annotations, which enable an application developer to add domain-specific information to a model.

In some embodiments, the model is an XML-based language that allows an application developer to define model entities, the relationships between those entities, and abstract services responsible for delivering the model entities to data clients. In some embodiments, the modeling language works in conjunction with a set of Java-based API's, referred to as the core API's (and depicted in FIG. 3 as part of the model processing module 80), that process and validate the content of the models and can also generate concrete application code, based on the model. For example, the core modeling API's 80 provide built-in support for generating the following:

Script-based (e.g., ActionScript, JavaScript, JScript) objects that represent model entities and services for calling data services from a client application.

Java-based objects that represent model entities, the relationships between those entities, and services on an application server. The generated services can make queries to database tables that correspond directly to the entity elements in the model.

Consistent with some embodiments of the invention, script-based client code and Java-based server code can be generated from the same model that maps to a SQL database. Consequently, an application developer can rapidly create a functional client application that calls an application server destination and manipulates data in a SQL database.

When a model is deployed to an application server 42, the model deployment module 40 processes the model, and in particular, the defined model entities, to generate an object-relational mapping (ORM) configuration file 46. This is illustrated in FIG. 2 by the arrow leading to the block with reference number 46. The ORM configuration file 46 specifies mapping attributes to define a mapping between data elements in an object domain, and data elements in a relational database domain. For instance, in some embodiments, the ORM configuration file is a Hibernate configuration file, and specifies a mapping between data properties of an object defined by a model entity and a SQL query used to select data from a relational database.

In addition to generating the ORM configuration file, the model deployment module 40 processes the model 42 to generate one or more ORM objects (e.g., data access objects (DAO)) 48. In some embodiments, one ORM object is generated for each model entity. These ORM objects, or DAO's, are objects that provide an abstract interface to a type of persistence mechanism (e.g., a database), without exposing details of the database. Like the ORM configuration file, the ORM objects provide a mapping between data elements in an object domain, and data elements in a relational database domain—or, from application calls to the persistence layer. The ORM objects provide an isolation layer—in effect, separating the concerns of what data accesses the application needs, in terms of domain-specific objects and data types (e.g., the public interface of the DAO), and how these needs can be satisfied with a specific relational database and database schema (e.g., the implementation of the DAO).

The model deployment module 40 also generates an application server-specific data management destination object 48 for each model entity defined in the model. For example, in a particular embodiment with the LiveCycle Data Services web application, the destination objects generated would conform to the LiveCycle Data Services requirements. These destination objects are addressable and provide a client application with an addressable target for requesting data or services provided by the various data objects and data management tier.

Consistent with some embodiments of the invention, the model processing module 40 generates a model entity utility module 52 for each model entity defined in the model. As described in greater detail below, the model entity utility module 52 enables, on a per model entity basis, support for advanced model-supported functions, including: derived properties, constraints, validations, variant properties, and style information. For instance, when a client application communicates a request to the application server for a data element defined by a derived property, the destination object invoked by the client request will invoke the model entity utility model corresponding to the invoked destination object to request that the utility model generate the derived property.

Figure 3:
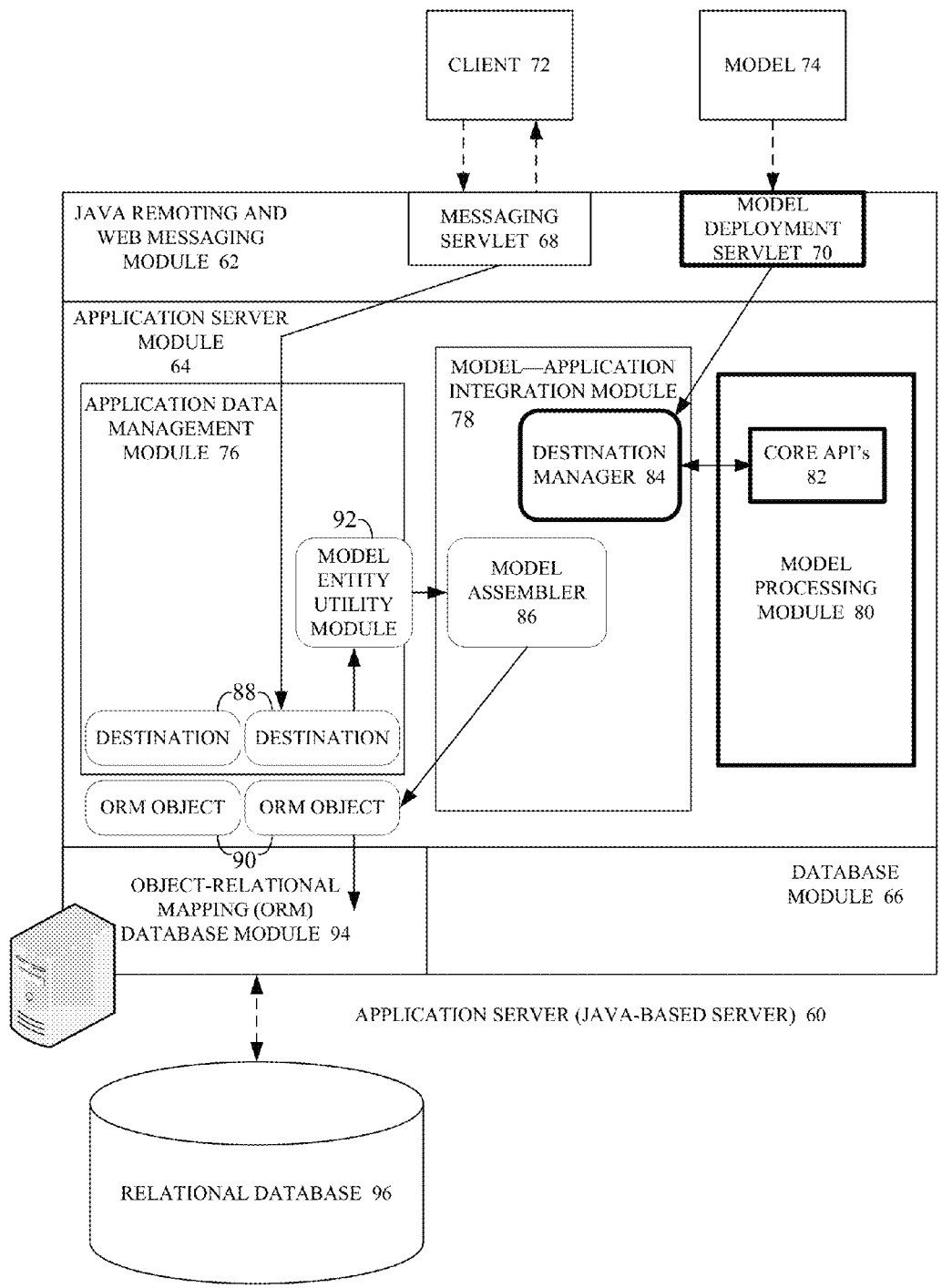
FIG. 3 is a functional block diagram of an application server, including an illustration of some of the functional modules that comprise a model deployment service, according to an embodiment of the invention.

FIG. 3 is a functional block diagram of an application server 60, including some of the functional modules that comprise a model deployment service, according to an embodiment of the invention. The application server 60 illustrated in FIG. 3 is shown to have three tiers—a communications tier, represented by the Java Remoting and Web Messaging Module 62; an application tier, represented as the application server module 64; and the database tier, represented as the database module 66.

In one embodiment of the invention, the communications tier may be implemented with Blaze DS from Adobe, Inc. Of course, a wide variety of other software applications or components might also be used. In any case, the communications tier (Java Remoting and Web Messaging Module 62) is shown to include both a messaging servlet 68 and a model deployment servlet 70. At runtime, the messaging servlet operates to handle the routing of messages between the application server module 64 and the client applications (e.g., client 72). Similarly, during model deployment, the model deployment servlet 70 handles the routing of the model 74 between the software development application that is communicating the model to the application server 60, and the application server 60 itself.

In some embodiments, the application tier (represented in FIG. 3 as the application server module 64) may be implemented with Adobe LiveCycle Data Services. Of course, a wide variety of alternative software applications or components might also be used. In any case, as illustrated in FIG. 3, the application server module 64 includes three sub-modules: an application data management module 76, a model-application integration module 78, and a model processing module 80.

In some embodiments, when a model is first communicated to the application server to be deployed, the model processing module 80 receives and processes the model. In particular, various processes associated with the core API of the model processing module are invoked. One such process involves validating the model to determine whether the model conforms to certain formatting and substantive requirements. Additionally, the model processing module 80 may save a copy of the model to non-volatile storage (e.g., a fixed disk drive) and modify one or more server initialization routines so that upon restarting the server, the model is automatically processed and deployed. In addition, the model processing module 80 processes the model to generate the outputs described in connection with the description of FIG. 2 (e.g., the outputs with reference numbers 46, 48, 50 and 52 in FIG. 2). For example, the model processing module 80 generates an ORM configuration file (e.g., a Hibernate XML file), and for each model entity, a corresponding ORM object 90 (e.g., Hibernate plain old java objects (POJOs)), a corresponding destination object 88, and a corresponding model entity utility module 92.

The model-application integration module 78 includes logic utilized to process model-driven applications, both in the deployment stage and at runtime. For example, the destination manager 84 of the integration module 78 facilitates the generation, deployment and management of the destination objects 88 during deployment of the model. The model assembler 86 handles requests from destination objects and ORM objects 90 to facilitate the communication of data between modules operating in the object domain and the relational database domain.

The application data management module 76 provides the core library and an API for performing various data processing tasks loosely associated with the application logic. For example, the application data management module 76 operates in conjunction with one or more other modules to enable data caching, data synchronization across all participating clients, efficient paging of data out to clients, and lazy loading of associations. In addition, the destination objects 88 and model entity utility module 92 are part of and operate in conjunction with the application data management module 76. The model entity utility module 92 provides functionality associated with advanced modeling features, such as derived properties, constraints, validations, variant properties, and style information.

The database module 66 includes the object-relational mapping database module 94. In some embodiments, this module 94 is an implementation of Hibernate. Of course, other software components or applications might be used to provide similar functionality. In any case, the object-relational mapping database module 94 includes the SQL commands for querying the relational database 96. The database module 94 operates in conjunction with the ORM objects 90 to provide a mechanism for converting data in the object domain to the relational database domain and vice versa.

When a model 74 is initially communicated to the application server 60, the model is received at the model deployment servlet 70. The model deployment servlet 70 routes the model 74 to the destination manager 84 and ultimately to the model processing module 80 where the model 74 is initially processed to generate the various outputs, including an ORM configuration file, one or more destination objects 88, one or more ORM objects 90, and one or more model entity utility modules 92.

At runtime, a client 72 communicates a message to the messaging servlet 68 of the application server 60. The message is directed to the addressed destination object 88 where it is initially processed. If the message includes a request to perform a simple CRUD operation, the destination object invokes the model assembler 86, which in turn instantiates an ORM object that is processed by the ORM database module 94. If the request involves an advanced operation, such as a request for a derived property, the model entity utility module 92 for the destination object 88 is invoked to process the request. Further aspects of the model deployment and runtime routines are described in connection with the description of FIG. 4.

Figure 4:
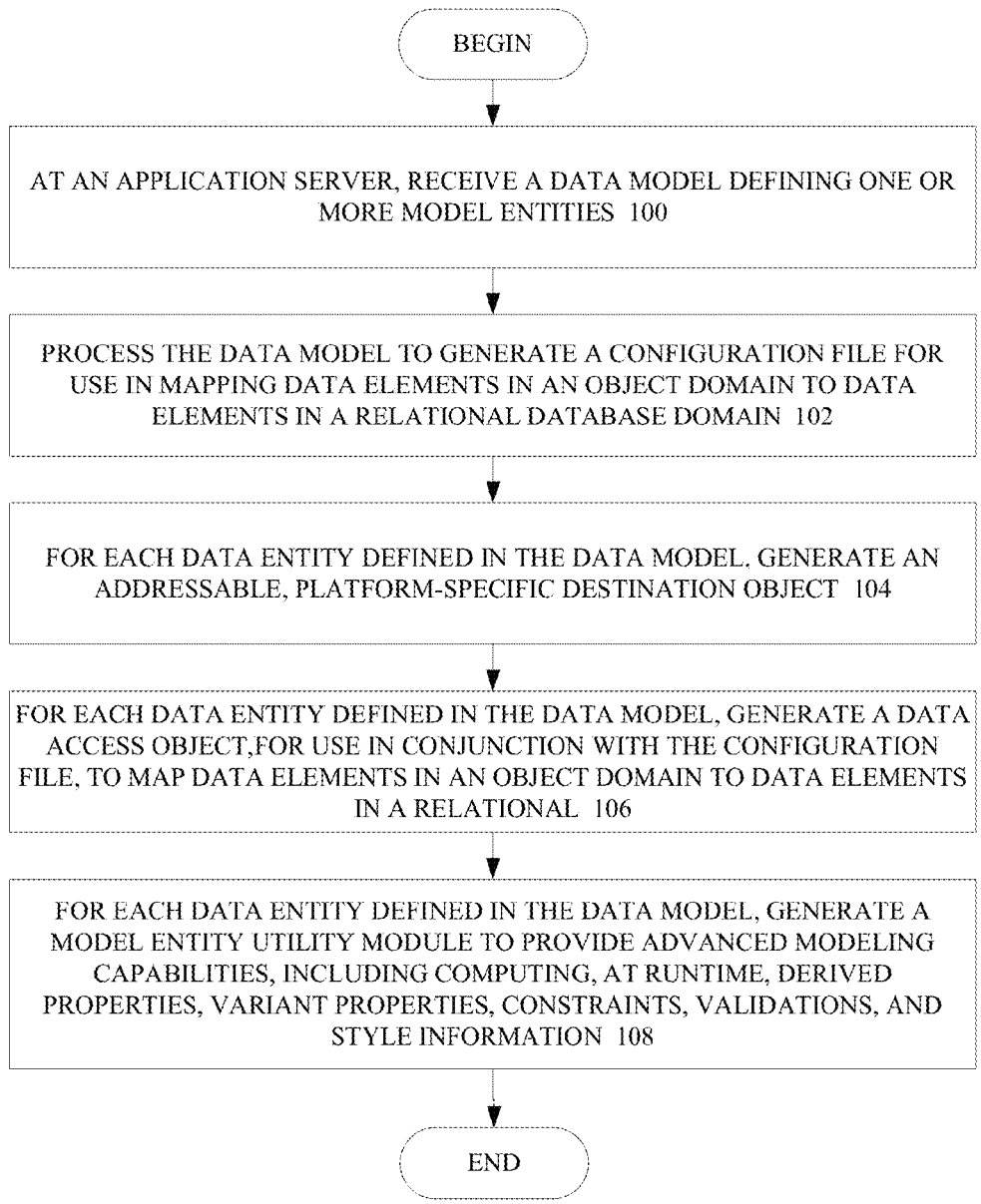
FIG. 4 illustrates an example of a method, according to an embodiment of the invention, for deploying a model to configure an application server and application corresponding to the model.

FIG. 4 illustrates an example of a method, according to an embodiment of the invention, for deploying a model to configure an application server and application corresponding to the model. At method operation 100, an application server receives a model defining one or more model entities. For example, the model may be received at a model deployment servlet, which is part of a model deployment module.

At method operation 102, the model is processed to generate a configuration file for use in mapping data elements (e.g., data properties of objects) in the object domain, to data elements in a relational database domain. Next, at method operation 104, for each model entity defined in the model, an addressable destination object is generated. These destination objects receive client requests involving requests for data operations, at runtime.

Next, at method operation 106, for each model entity defined in the model, a data access object, or ORM object, is generated. In some embodiments, the ORM objects are Hibernate POJOs. The Hibernate POJOs facilitate the conversion of data between an object domain and a relational database domain.

Finally, at method operation 108, for each model entity defined in the model, a model entity utility module is generated. The model entity utility module provides advanced modeling features, including the ability to compute at runtime, derived properties, variant properties, constraints, validation and style information.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. Accordingly, the modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or as a service, for example, such as in the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Figure 5:
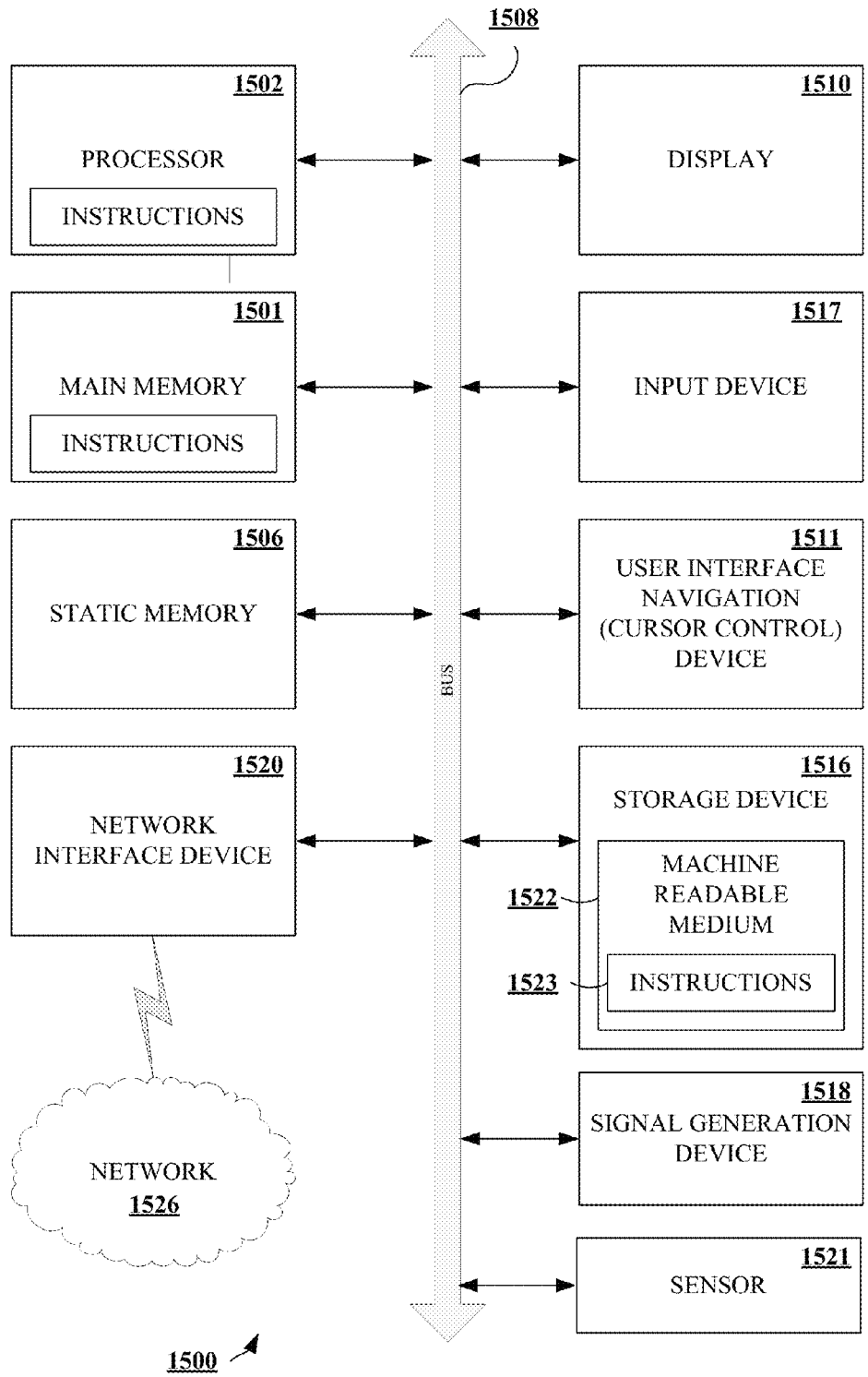
FIG. 5 is a block diagram of a machine in the form of a computer system (e.g., server) within which a set of instructions, for causing the machine to perform any one or more of the methodologies discussed herein, may be executed.

FIG. 5 is a block diagram of a machine in the form of a computer system within which a set of instructions, for causing the machine to perform any one or more of the methodologies discussed herein, may be executed. In some embodiments, the machine operates as a standalone device or may be connected (e.g., networked) to other machines. In a networked deployment, the machine may operate in the capacity of a server or a client machine in server-client network environments, or as a peer machine in peer-to-peer (or distributed) network environments. The machine may be a personal computer (PC), a tablet PC, a server, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device (e.g., drive unit 1516), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the included claims, along with the full range of equivalents to which such claims are entitled.

What is claimed is:

1. A computer-implemented method comprising:
    upon receiving at an application server a data model defining one or more model entities, processing the data model to generate a destination object and a data-access object for each model entity in the data model, the data access object to map data elements of a model entity in an object domain to data elements in a relational database domain;
    generating a portion of a new database schema, or updating a portion of an existing database schema, to coincide with each data-access object generated for each model entity in the data model;
    at runtime, processing a client-request received at a destination object to facilitate the reading, writing, creating, or updating of a set of persisted data elements associated with the database schema; and
    facilitating efficient paging by retrieving from a relational database and communicating to a client a subset of data satisfying a query directed to the relational database, the amount of data included in the subset determined by a paging parameter specified in the one or more model entities defined by the data model.

2. The computer-implemented method of claim 1, further comprising:
    processing the data model to generate a configuration file with mapping information used to map data elements of a model entity in an object domain to data elements in a relational database domain.

3. The computer-implemented method of claim 2, wherein the configuration file is a Hibernate configuration file formatted as an extensible markup language (XML) document.

4. The computer-implemented method of claim 1, further comprising:
    processing the data model to generate a model entity utility module for a model entity, the model entity utility module to validate, at runtime, the state of an instance of a model entity being created or updated at the request of a client, the validation based on evaluation of a constraint expression involving one or more data elements specified in the model entity being created or updated.

5. The computer-implemented method of claim 1, further comprising:
    processing the data model to generate a model entity utility module for a model entity, the model entity utility module to validate, at runtime, the state of an instance of a model entity being created or updated at the request of a client, the validation based on evaluation of a constraint expression involving one or more data elements specified in the model entity being created or updated.

6. The computer-implemented method of claim 1, further comprising:
    processing the data model to generate a model entity utility module for a model entity, the model entity utility module to validate, at runtime, the state of an instance of a model entity being created or updated at the request of a client, the validation based on evaluation of a constraint expression involving a data element specified in the model entity, with which the constraint expression is associated.

7. The computer-implemented method of claim 1, further comprising:
    processing the data model to generate a model entity utility module for a model entity, the model entity utility module to compute, at runtime, a derived data element of a model entity, the derived data element dependent upon one or more data elements of one or more model entities specified in the data model.

8. The computer-implemented method of claim 1, further comprising:
processing the data model to generate a model entity utility module for a model entity, the model entity utility module to compute, at runtime, a variant data element of a model entity, the variant data element dependent upon one or more data elements of one or more model entities specified in the data model.

9. The computer-implemented method of claim 1, further comprising:
facilitating data caching by caching a data element that has been retrieved from a relational database in response to a first client request received from a first client, so as to facilitate providing the data element to a client upon receiving a second client request from the client.

10. The computer-implemented method of claim 1, further comprising:
facilitating lazy loading of a data access object by generating, responsive to a client request, an instance of the data access object while deferring the loading of certain data elements until those data elements are requested.

11. The computer-implemented method of claim 1, wherein the data access object generated for each model entity is an annotated Hibernate plain old java object (POJO).

12. The computer-implemented method of claim 1, further comprising:
upon receiving at the application server the data model defining one or more model entities, processing the data model with the model deployment module to store a copy of the model at the application server; and
upon restarting the application server, configuring the application server to operate as specified by the model, and automatically initiating an application based on the data model.

13. An application server comprising:
a communication interface to facilitate communication of messages between the application server and a client;
a data management module to facilitate processing of messages received from the client, the database management module further to facilitate efficient paging by retrieving from a relational database and communicating to a client a subset of data satisfying a query directed to the relational database, the amount of data included in the subset determined by a paging parameter specified in one or more model entities defined by a data model;
a database module to facilitate creating, storing, updating and retrieving data in a relational database; and
a model deployment module to receive the data model defining the one or more model entities and to deploy the model by processing the data model to generate a destination object and a data-access object for each model entity in the data model, the data-access object to map data elements of a model entity in an object domain to data elements in a relational database domain.

14. The application server of claim 13, wherein the model deployment module is to generate a configuration file with mapping information used to map data elements of a model entity in an object domain to data elements in a relational database domain.

15. The application server of claim 13, wherein the database module is to generate or update a portion of a database schema to coincide with one or more data-access objects generated by the model deployment module.

16. The application server of claim 13, wherein, at runtime, a destination object generated by the model deployment module is to process a message received from a client to facilitate the reading, writing, creating, or updating of a set of persisted data elements associated with the database schema.

17. The application server of claim 13, wherein the model deployment module is to generate a model entity utility module for a model entity, the model entity utility module to validate, at runtime, the state of an instance of a model entity being created or updated at the request of a client, the validation based on evaluation of a constraint expression involving one or more data elements specified in the model entity being created or updated.

18. The application server of claim 13, wherein the model deployment module is to generate a model entity utility module for a model entity, the model entity utility module to compute, at runtime, a derived data element of a model entity, the derived data element dependent upon one or more data elements of one or more model entities specified in the data model.

19. The application server of claim 13, wherein the model deployment module is to generate a model entity utility module for a model entity, the model entity utility module to compute, at runtime, a variant data element of a model entity, the variant data element dependent upon one or more data elements of one or more model entities specified in the data model.

20. The application server of claim 13, wherein the data management module is to facilitate data caching by caching a data element that has been retrieved from a relational database in response to a first client request received from a first client, so as to facilitate providing the data element to a client upon receiving a second client request from the client.

21. The application server of claim 13, wherein the database management module is to facilitate lazy loading of a data access object by generating, responsive to a client request, an instance of the data access object while deferring the loading of certain data elements of the data access object until those data elements are requested.

22. A computer-readable non-transitory storage medium storing instructions, which, when executed by a computer, cause the computer to perform operations to deploy a data model defining one or more model entities, the operations including:
processing the data model to configure object-relational mapping logic to map data elements of model entities in an object domain to data elements in a relational database domain;
generating a portion of a new database schema, or updating a portion of an existing database schema, to coincide with information presented in the model entities;
at runtime, processing a client request to facilitate reading, writing, creating, or updating a set of persisted data elements associated with the database schema; and
facilitating efficient paging by retrieving from a relational database and communicating to a client a subset of data satisfying a query directed to the relational database, the amount of data included in the subset determined by a paging parameter specified in the one or more model entities of the data model.

* * * * *